United States Patent Office 3,336,408
Patented Aug. 15, 1967

3,336,408
PRODUCTION OF ALKENYL BENZENES
Clifford William Capp, Ewell, Surrey, Edward James Gasson, Epsom Downs, Surrey, Patricia Eileen Grindlay, Sutton, Surrey, and Barrie Wood, Epsom, Surrey, England, assignors to The Distillers Company Limited, Edinburgh, Scotland, a British company
No Drawing. Filed Aug. 5, 1964, Ser. No. 387,801
Claims priority, application Great Britain, Aug. 13, 1963, 31,900/63
17 Claims. (Cl. 260—669)

This invention relates to the catalytic oxidative dehydrogenation of alkyl benzenes to produce alkenyl benzenes.

According to the present invention the process for the production of an alkenyl benzene comprises reacting a mono or dialkyl benzene, in which the alkyl side chains contain separately at least two carbon atoms, at an elevated temperature in the vapour phase, with molecular oxygen over an oxidation catalyst comprising antimony oxide alone or in combination with an oxide of a polyvalent metal having an atomic number 22 to 50, 57 to 83, 90 or 92 whilst maintaining the conditions of reaction such that oxidation of the starting material to acidic reaction products is substantially avoided.

The antimony oxide catalyst may be derived from an antimony compound which is partially or completely converted under the reaction conditions to an oxide of antimony. The catalyst, as indicated above, may comprise antimony oxide alone or in combination with the oxide of another polyvalent metal such as vanadium, chromium, iron, cobalt, nickel and bismuth. These catalysts may be regarded either as mixtures of antimony oxides with an oxide or oxides of the polyvalent metals or as oxygen-containing compounds of antimony and polyvalent metal; under the reaction conditions the catalyst may contain either or both forms. These catalysts may be prepared, for instance, by intimately mixing antimony oxide or the hydrated oxide e.g. that obtained by the action of nitric acid on antimony metal with the other metal oxide or hydroxide. Alternatively the catalyst may be prepared by co-precipitation of the hydroxides from solutions of, for instance, the chlorides.

The activity of the catalyst is frequently improved by heat-treatment, in a molecular oxygen containing gas, for instance at a temperature between 500° C. and 1100° C.

The catalyst may be deposited on a support material such as silica, alumina or a diatomaceous earth e.g. Celite[1] if desired.

The catalyst supports may be subjected to a pre-heat treatment before deposition of the catalyst.

In the process of this invention, an alkyl benzene as defined in admixture with molecular oxygen, is brought into contact with the catalyst in any suitable manner, for example in a fixed, moving or fluidised bed or in an adiabatic reactor. Suitable alkyl benzene starting materials may be for example, ethyl benzene, diethyl benzene or isopropyl benzene which result in the production of styrene, ethylstyrene, divinyl benzene or α-methylstyrene respectively. The preferred starting material is ethylbenzene. The concentration of alkyl benzene in the feed may vary within fairly wide limits, and may suitably be, for example, about 10% to about 30% by volume.

The concentration of oxygen in the reaction mixture may vary within fairly wide limits, and may suitably be, for example, in the range 5 to 45% and preferably about 10% to 20% by volume. The oxygen content is suitably supplied in the form of air. The feed may also contain a gaseous diluent which is inert under the conditions of the reaction, and which may be, for example, nitrogen and/or steam.

The reaction may suitably be carried out at temperatures in the range 200° to 600° C. and preferably in the range 375 to 500° C. The contact time may be, for example within the range 0.5 to 30 seconds. The reaction may be carried out at atmospheric pressure, superatmospheric pressure, or subatmospheric pressure.

The alkenyl benzene (formed in reaction according to this invention) may be recovered by any suitable means, for example by extraction into a solvent, or by liquefaction, if necessary with refrigeration and fractionation of the product.

The process of the invention is illustrated further by the following examples.

*Example 1*

Hydrated cobalt chloride ($CoCl_2.6H_2O$) 79.3 parts by weight was dissolved in water 1000 parts by weight. Antimony pentachloride, 199.5 parts by weight, was added to the solution, dropwise, over 15 minutes with constant stirring. The mixture attained a maximum temperature of 38° C. After 15 minutes more, approximately 742 parts by volume of ammonium hydroxide solution (made by diluting 371 parts by volume of S.G. 0.880 ammonia with its own volume of water) was added to bring the pH value of the mixture to 7. The pink precipitate was filtered and washed by re-suspending in three successive lots of 2000 parts by weight of distilled water. The filtered mixture of hydrated oxides was dried for 24 hours at 120° ground up and formed into ⅛ in. diameter tablets. The latter were heated at 450° C. for 2 hours in an air stream and then heated gradually to 700° and maintained at that temperature for 16 hours.

Ethylbenzene (13.2 parts by vol./hr. of liquid) was vaporised, mixed with air, 11,950 parts by vol./hr. and passed through this catalyst (27 parts by vol.) in a thermostatically controlled reactor at 450° C. After 24 hours, the yield of styrene was 36% at an efficiency of 89%.

*Example 2*

This illustrates the higher yield which may be obtained with the same catalyst as in Example 1 by increasing the $O_2$:ethyl benzene ratio.

Ethyl benzene (7.0 parts by vol./hr. of liquid) was vaporised, mixed with air 9762 parts by vol./hr. and pure nitrogen, 3305 parts by vol./hr. and passed through the same catalyst used (27 parts by vol.) in Example 1, in a thermostatically controlled reactor at 475° C. After 24 hours, the yield of styrene was 57% at an efficiency of 85%.

*Example 3*

Powdered antimony metal, 315 parts by weight, was added portionwise with stirring to concentrated nitric acid, 1350 parts by volume, at 70° C. The mixture was then warmed till no more brown fumes were evolved, the liquid decanted off and the solid washed by suspension in three changes of distilled water (1000 parts by vol. each).

To nickel nitrate, 83.4 parts by weight dissolved in 200 parts by volume of water, were added with stirring, 70 parts by volume of 0.880 ammonia. The precipitate was washed with 200 parts by volume of distilled water.

The antimony oxide and nickel hydroxide were then mixed by suspension in water, filtered off and the filter cake dried at 120°. The mixed oxides were formed into ⅛ in. diameter pellets, heated for 2½ hours in an air stream at 400° C., then heated gradually to 500° and maintained at this temperature for 16 hours.

Ethyl benzene (7.8 parts by vol./hr. of liquid) was vaporised, mixed with 7183 parts by volume/hour of air and 5746 parts by volume/hour of steam and passed over

[1] Registered trademark.

the above catalyst (27 parts by vol.) in a thermostatically controlled reactor at 450° C. The yield of styrene was 42% at an efficiency of 83%, after 10 hours on stream.

*Example 4*

An antimony oxide catalyst was prepared by reaction of powdered antimony metal with nitric acid as described in Example 3. After washing, the oxide was dried at 120°, pulverised and formed into ⅛ in. diameter pellets which were heated in an air stream at 450° for 2 hours, then heated gradually to 600° and maintained at this temperature for 16 hours.

Ethyl benzene (7.8 parts by vol./hr. of liquid) was vaporized and mixed with air, 8620 parts by volume/hour and nitrogen, 4310 parts by volume/hour and passed over this catalyst (27 ml.) in a thermostatically controlled reactor at 450°. After 24 hours, the styrene yield was 45% at an efficiency of 87%.

We claim:
1. A process for the production of an alkenyl benzene which comprises reacting an alkyl benzene in which the alkyl side chains contain separately at least two carbon atoms at an elevated temperature in the vapour phase, with a gas consisting essentially of molecular oxygen or molecular oxygen in combination with an inert diluent over an oxidation catalyst selected from the group consisting of (i) antimony oxide alone and (ii) in combination with an oxide of a polyvalent metal having an atomic number selected from the range 22 to 50, 57 to 83, 90 and 92 whilst maintaining the conditions of reaction such that oxidation of the starting material to acidic reaction products is substantially avoided.

2. A process as claimed in claim 1 wherein the polyvalent metal is selected from the group vanadium, chromium, iron, cobalt, nickel or bismuth.

3. A process as claimed in claim 1 wherein the catalyst comprises antimony oxide in combination with an oxide of a polyvalent metal and is prepared by intimate admixture of a material selected from the group consisting of antimony oxide and a hydrated oxide of antimony formed by the action of nitric acid on antimony metal with a material selected from the group consisting of an oxide and hydroxide of the polyvalent metal.

4. A process as claimed in claim 1 wherein the catalyst comprises antimony oxide in combination with an oxide of a polyvalent metal and is prepared by co-precipitation from a mixed aqueous solution of the metal chlorides.

5. A process as claimed in claim 1 wherein the catalyst is heated in a molecular oxygen containing gas to a temperature between 500 and 1100° C. before use.

6. A process as claimed in claim 1 wherein the catalyst is deposited on a support material.

7. A process as claimed in claim 6 wherein the support material is selected from the group consisting of silica, alumina and diatomaceous earth.

8. A process as claimed in claim 6 wherein the support material is heated before deposition of the catalyst.

9. A process as claimed in claim 1 wherein the alkyl benzene is selected from the group consisting of ethyl benzene, diethyl benzene, and isopropyl benzene.

10. A process as claimed in claim 1 wherein the proportion of alkyl benzene in the feed is in the range about 10% to about 30% by volume.

11. A process as claimed in claim 1 wherein the concentration of oxygen in the reaction mixture is in the range 5 to 45% by volume.

12. A process as claimed in claim 11 wherein the concentration of oxygen is about 10 to 20% by volume.

13. A process as claimed in claim 1 wherein the feed contains a gaseous diluent which is inert under the conditions of the reaction.

14. A process as claimed in claim 13 wherein the gaseous diluent is selected from the group consisting of nitrogen, steam and admixtures thereof.

15. A process as claimed in claim 1 carried out at temperatures in the range 200 to 600° C.

16. A process as claimed in claim 15 carried out at temperatures in the range 375 to 500° C.

17. A process as claimed in claim 1 carried out with a contact time within the range 0.5 to 30 seconds.

References Cited

UNITED STATES PATENTS

| | | | |
|---|---|---|---|
| 3,159,688 | 12/1964 | Jennings et al. | 260—280 |
| 3,197,419 | 7/1965 | Callahan et al. | 260—680 |
| 3,207,805 | 9/1965 | Gay | 260—680 |
| 3,207,806 | 9/1965 | Bajars | 260—669 X |
| 3,251,900 | 5/1966 | Callahan et al. | 260—680 |

OTHER REFERENCES

Emmett: "Catalytic Dehydrogenation," Catalysis, vol. III, pages 453–491, Reinhold.

Publishing Corp., New York, 1955, QD501.E58, pages 466, 470, and 481.

DELBERT E. GANTZ, *Primary Examiner.*

C. R. DAVIS, *Examiner.*

Notice of Adverse Decision in Interference

In Interference No. 96,215 involving Patent No. 3,336,408, C. W. Capp, E. J. Gasson, P. E. Grindlay, and B. Wood, PRODUCTION OF ALKENYL BENZENES, final judgment adverse to the patentees was rendered Sept. 23, 1969, as to claims 1, 2, 5–11 and 13–17.

[*Official Gazette March 17, 1970.*]